United States Patent
Nienburg et al.

(10) Patent No.: US 8,758,502 B2
(45) Date of Patent: Jun. 24, 2014

(54) SLURRY FORMULATION FOR THE PRODUCTION OF THERMAL BARRIER COATINGS

(75) Inventors: Hans-Christoph Nienburg, Heidelberg (DE); Adnan Eroglu, Untersiggenthal (CH); Hartmut Haehnle, Kuessaberg (DE)

(73) Assignee: Alstom Technology Ltd., Baden (CH)

( * ) Notice: Subject to any disclaimer, the term of this patent is extended or adjusted under 35 U.S.C. 154(b) by 651 days.

(21) Appl. No.: 12/826,798

(22) Filed: Jun. 30, 2010

(65) Prior Publication Data
US 2010/0330282 A1    Dec. 30, 2010

(30) Foreign Application Priority Data
Jun. 30, 2009    (CH) ...................... 1014/09

(51) Int. Cl.
| C09D 1/02 | (2006.01) |
| C09J 1/02 | (2006.01) |
| B32B 3/26 | (2006.01) |
| B05D 3/02 | (2006.01) |

(52) U.S. Cl.
USPC ................. 106/600; 428/305.5; 427/379

(58) Field of Classification Search
USPC ................. 106/600; 428/305.5; 427/379
See application file for complete search history.

(56) References Cited

U.S. PATENT DOCUMENTS

| 4,485,151 | A | | 11/1984 | Stecura |
| 4,871,694 | A | * | 10/1989 | Legare ..................... 501/39 |
| 5,034,358 | A | | 7/1991 | MacMillan |
| 5,985,470 | A | * | 11/1999 | Spitsberg et al. .......... 428/689 |
| 7,476,703 | B2 | | 1/2009 | Ruud et al. |
| 2004/0214938 | A1 | | 10/2004 | Ruud et al. |
| 2006/0179770 | A1 | | 8/2006 | Hodder |
| 2007/0134408 | A1 | | 6/2007 | Skoog et al. |
| 2007/0180828 | A1 | | 8/2007 | Webb |
| 2008/0026248 | A1 | * | 1/2008 | Balagopal et al. .......... 428/688 |
| 2010/0205973 | A1 | | 8/2010 | Tschuor et al. |

FOREIGN PATENT DOCUMENTS

| DE | 102007001835 A1 | 8/2007 |
| EP | 0396240 A1 | 11/1990 |
| EP | 1471043 A2 | 10/2004 |
| EP | 1662201 A2 | 5/2006 |
| EP | 1739204 A2 | 1/2007 |
| WO | WO 2009040286 A1 | 4/2009 |

* cited by examiner

*Primary Examiner* — Shuangyi Abu Ali
(74) *Attorney, Agent, or Firm* — Buchanan Ingersoll & Rooney PC

(57) ABSTRACT

A slurry formulation for production of a patch or a strip of a thermal barrier coating includes 20-60 dry weight percent of alkali metal silicate binder, 40-80 dry weight percent of ceramic fillers including at least one ceramic filler selected from the group consisting of yttria-stabilized zirconia and magnesia, 0-20 dry weight percent of additives, wherein the dry weight percent of the alkali metal silicate binder, the ceramic fillers and the additives add up to 100%, and one of a solvent and suspension agent.

20 Claims, 4 Drawing Sheets

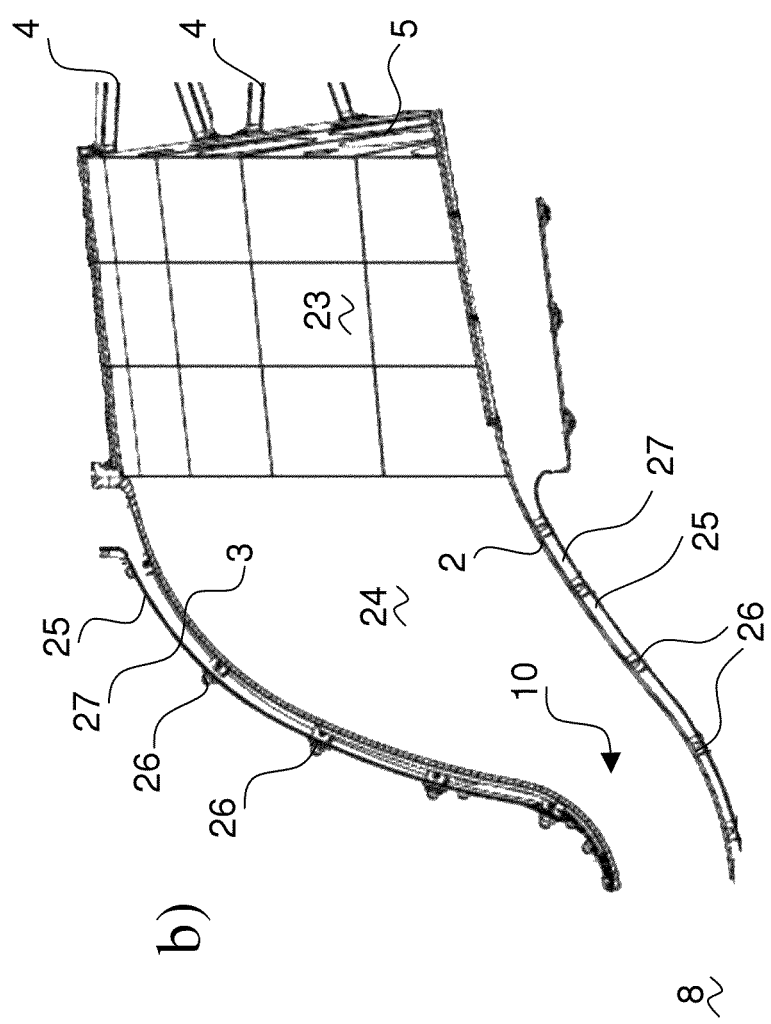

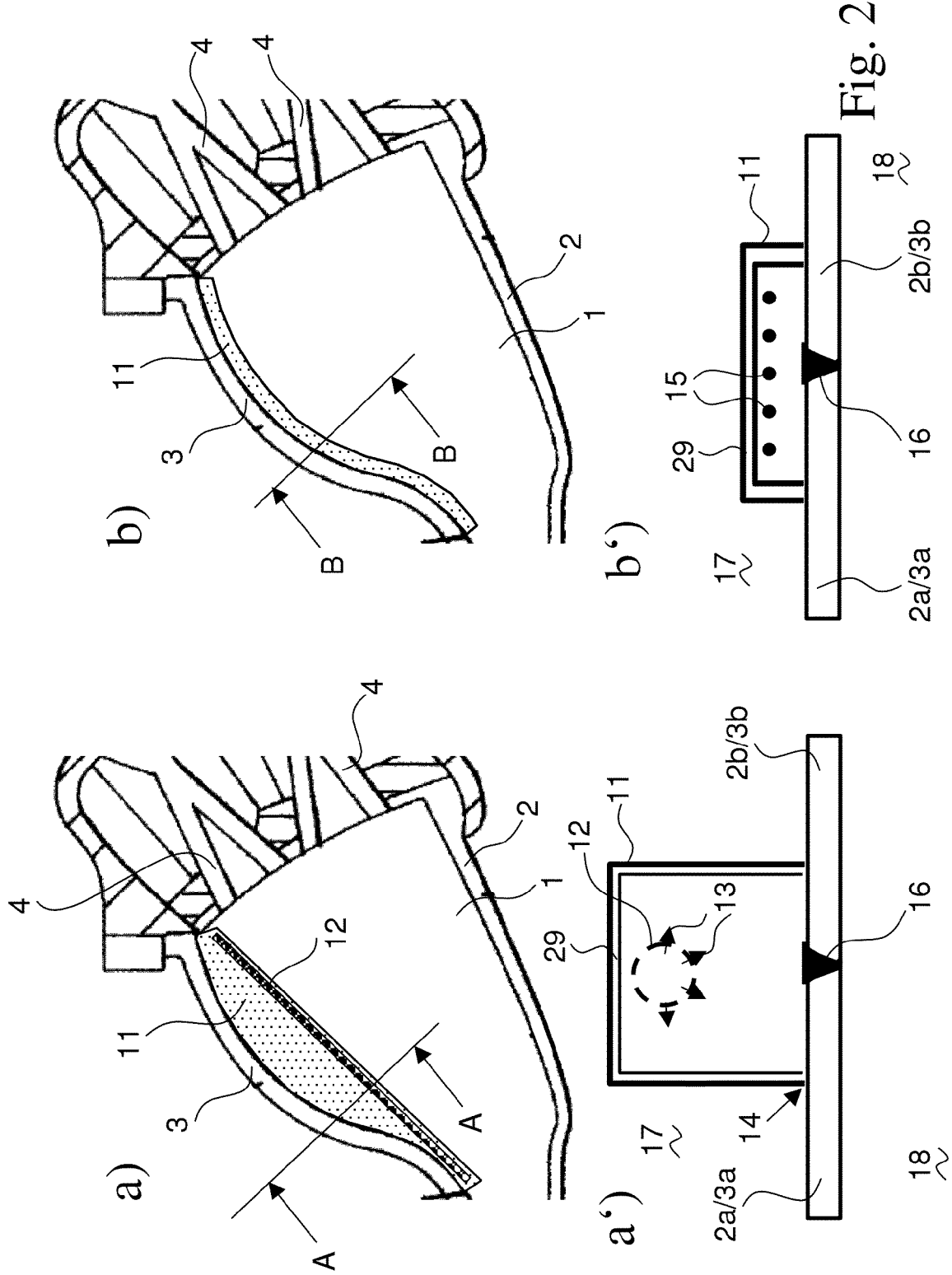

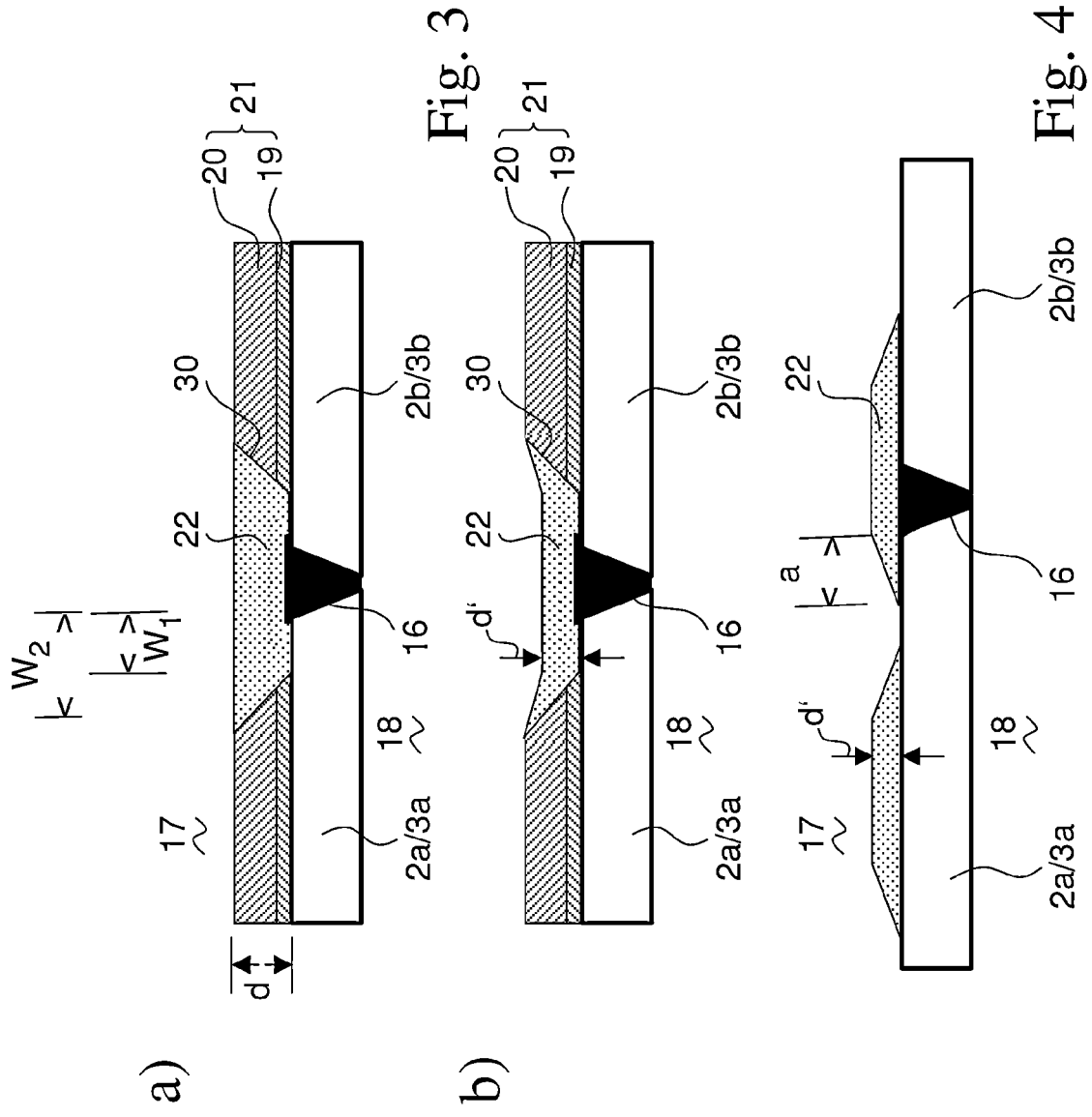

SLURRY FORMULATION FOR THE PRODUCTION OF THERMAL BARRIER COATINGS

CROSS REFERENCE TO PRIOR APPLICATIONS

Priority is claimed to Swiss Application No. CH 01014/09, filed Jun. 30, 2009, the entire disclosure of which is incorporated by reference herein.

FIELD

The present invention relates to an improved slurry formulation (ceramic suspension) which can be used for the production of a thermal barrier coating, to a process for the production of such a slurry formulation, and also to a process for the production of a thermal barrier coating using such a slurry formulation.

BACKGROUND

There are many different ways to construct gas turbine combustion chambers. One of these is the use of annular combustion chambers, to which the present invention relates, inter alia. These are annular combustion chambers which are arranged in a substantially rotationally symmetrical manner around the rotor of the gas turbine between the compressor and turbine. A combustible gas mixture is introduced into the annular combustion chamber via normally a large number of burners, and this gas mixture burns therein and flows into the turbine as an annular flow. The substantially annular space is delimited to the inside, i.e. to the rotor side, by a so-called inner shell or inner burner casing, and to the outside by a so-called outer shell or outer burner casing. These shells often comprise a plurality of individual portions which are welded or mechanically joined to each other and thereby form the structural unit of a gas turbine. As is known from EP 1662201, the individual portions may have a double-walled design, such that a flow of cooling air can be guided between the substantially parallel walls.

In order to protect the inner and outer burner casings against the high temperatures produced within the combustion chamber, it is generally known to coat the inner surfaces exposed to the heat with a thermal barrier coating (TBC), for example zirconia partially stabilized with yttria (YSZ), which can withstand a thermal shock of up to 1150° C. and material fatigue. The YSZ coating can be applied by plasma spraying or by electron beam vapor deposition. Although these TBCs are available at all times, they cannot be applied to a weld seam if common materials are used as the starting material, as is known from DE 10 2007 001 835. The life of the welded joint between the portions of the burner casing is therefore extremely limited.

The high temperatures and the evolution of heat in the combustion chamber mean that the shells are exposed to high thermal loads. In order to ensure a sufficient life in spite of the high thermal loading, annular combustion chambers which employ different cooling methods and are also mostly combined with thermal barrier coatings or protective shields have been developed.

Thus, by way of example, DE 10 2007 001 835 (already mentioned above) describes a combustion chamber casing, in which the outer shell is formed from two half-shells welded to each other at a joining line, and in which the inner shell is formed from two half-shells likewise welded to each other at a joining line. In order to make it possible to guarantee protection of the weld seam, the half-shells each have a joining flange, at the joining line, which is remote from the hot side and serves to join the half-shells to the weld seam. In addition, a heat shield is arranged on the hot-gas side of this weld seam, offset from the latter, and protects the weld seam against the high temperatures.

WO 2009/040286 discloses a similar combustion chamber design. In order to protect the weld seam, this document proposes a film cooling means which is guided deliberately along the weld seam by providing an indentation, which points away from the hot side, in the region of the weld seam.

SUMMARY OF THE INVENTION

The present invention relates to an improved slurry formulation (ceramic suspension) which can be used for the production of a thermal barrier coating. This is done, in particular, without the use of a separate, additional bond coat and also on particularly complex materials, for example on a weld seam which has not been subjected to sand-blasting.

In particular, the present invention relates to a slurry formulation for the production of a patch or a strip of a thermal barrier coating comprising a ceramic binder, ceramic fillers and, if appropriate, further additives, wherein the slurry formulation contains 20-60 dry weight percent of alkali metal silicate binder;
40-80 dry weight percent of ceramic fillers selected from the group consisting of yttria-stabilized zirconia, magnesia or mixtures thereof;
0-20 dry weight percent of additives (for example aluminum phosphates, microsilica, metakaolin, etc.), where the dry weight proportions of all the constituents add up to 100%;
and a solvent or suspension agent.

The fundamental bonding of a barrier coating using such a slurry formulation to the substrate is predefined not only by the more precise surface characteristics, but also primarily by the ceramic binder. The solvent or suspension agent typically used is water. It is generally preferred for the slurry formulation to have a viscosity in the range of 50-5000 mPas, preferably of 500-1500 mPas. A viscosity of this magnitude is preferably set by appropriately setting the amount of water (or solvent in general) shortly before the slurry formulation is applied and as the mixture is being mixed again or thereafter. Suitable additives are aluminum phosphates, microsilica or metakaolin. These additives can accelerate the hardening and dewatering of the coating.

Suitable ceramic binders for the intended use (nickel-base alloys as the base material) are, in particular, alkali metal silicates having a relatively high alkali metal oxide content (module 2-3). It is also possible to use mixtures of various alkali metal silicates. The high alkali metal concentration results in partial etching of the metal surface and means that it is possible for chemical bonds to at least partially form.

Accordingly, according to one preferred embodiment of the invention, the slurry formulation is characterized in that the ceramic binder is an alkali metal silicate or a mixture of alkali metal silicates, preferably having a module in the range of 1.8-3.5, the alkali metal silicate preferably being sodium silicate and/or potassium silicate and/or lithium silicate having a module in the range of 2-2.5. In other words, use is preferably made of a system of the general formula $M_2Si_xO_{2x+1}yH_2O$, where M is an alkali metal ion, x is the so-called module, a number from 1.8 to 3.5, and y is normally a number from 0 to 20, and preferred values for x are in the range of 2-2.5. The resistance to temperature changes can be influenced substantially by the fillers. In this case, the coefficient of thermal expansion (CTE) of the filler should be as close as possible to that of the base material. In addition, the thermal conductivity of the filler should be as low as possible so as to ensure the best possible shielding from heat.

Of the available ceramic fillers, yttria-stabilized zirconia and magnesia are particularly suitable since the coefficients of thermal expansion of these fillers are best matched to those of Inconel.

Yttria-stabilized zirconia: CTE=10-12.5 (10E-6/K)
Magnesia: CTE=11-13.5 (10E-6/K)
Inconel: CTE=14 (10E-6/K)

The coefficient of thermal expansion of the fillers is therefore preferably in the range of 10 (10E-6/K)-15 (10E-6/K) at room temperature, particularly preferably in the range of 12 (10E-6/K)-14 (10E-6/K). In general, it is also accordingly possible for other materials to be present in typically small amounts in the context of the fillers, as long as these do not shift the coefficient of thermal expansion of the coating produced out of this range.

Another decisive factor for the stability of the suspension and the capability thereof to bond to the substrate is the mean grain size of the fillers. Sub-μm powders (d50=0.01-1.00 μm) can be used to produce suspensions which are stable for a number of days and can readily be redispersed again even after relatively long storage. No sedimentation of the filler on the substrate surface takes place during application of the coating.

According to a further preferred embodiment, the slurry formulation is characterized in that the mean grain size (d50) of the ceramic fillers is in the range of 0.01-1 μm. Such a suspension makes it possible to carry out repairs even in regions, for example, of a weld seam if the substrate surface (Ni-base alloy) is preferably partially ground so as to produce a roughened and metallically pure surface if, as is preferred, alkali metal silicates (Li, Na, K) with a relatively high alkali metal oxide content (module 2-3.5) are used (this results in partial etching of the metal surface and means that it is possible for chemical bonds to form), fillers such as ZrO2 and MgO having a coefficient of thermal expansion similar to the Ni-base alloy are used, and the grain size of the fillers is chosen to be in the sub-μ range and dispersion takes place, for example, with ultrasound. This produces fine, stable suspensions which ensure good adhesion to the substrate.

In order to produce the suspension, the ceramic filler (35-60% by weight based on the aqueous suspension) is preferably mixed with an aqueous solution of the binder and dispersed with the aid of an Ultra-Turrax or of ultrasound. The amount of filler can be used to set the viscosity of the suspension such that the latter can be processed in optimum fashion by painting or spraying. The careful dispersion of the filler ensures good deagglomeration of the powder particles and the formation of a homogeneous, stable suspension.

The present invention also relates to a process for the production of a slurry formulation as described above, this process being characterized, in particular, in that the ceramic filler is added to an aqueous solution of the ceramic binder, and these are mixed to form a suspension, preferably by treatment in a mixer with a rapidly rotating blade such as, for example, an Ultra-Turrax, or by treatment with ultrasound, and, if appropriate, the viscosity is then set by the addition of water, preferably to a viscosity of the slurry formulation in the range of 50-5000 mPas (depending on whether the suspension is processed using the brush, the spray gun or a spatula).

A decisive factor for the quality and performance of the ceramic suspensions to be used for thermal barrier coatings on nickel-base alloys is, in particular, the combination of the parameters described (type of the ceramic binder and filler, mean grain size and proportion by weight of the filler, dispersion of the filler). For test purposes, Inconel substrates are coated using the suspensions described, the coatings are dried and then tested with the aid of a thermal shock test.

In addition, the present invention relates to a process for building up a region (typically a locally delimited region such as, for example, a patch or strip) of a thermal barrier coating with a slurry formulation as described above. The process is characterized, in particular, in that the slurry formulation is applied directly to a metallic substrate, typically substantially without a bond coat (however, in the boundary region to the adjoining thermal barrier coating, for example, a bond coat may still be present), in 2-4 application steps (by way of an exception, at most five or six application steps may also be employed if particularly thick coatings are to be built up; if, by way of example, a particularly thin coating is to be built up, it is also possible to carry out just one application step), with a coating application in each step normally of 0.05-0.3 mm, to give an overall coating thickness typically of 0.4-1 mm.

In this process, each application step is preferably followed by preliminary drying of the coating already applied (e.g. using a dryer at 70-80° C.), and the entire coating structure is then finished in a preferably two-stage drying operation and hardening operation. This two-stage operation comprises long-term treatment at a comparatively low temperature and short-term treatment at a comparatively high temperature, i.e. typically the following steps: the entire coating structure is held at a temperature of 80-100° C. for at least 6 hours and then at a temperature of at least 400° C. for at least 15 minutes. In other words, the application typically takes place without using a complex plasma process. The entire process preferably takes less than 24 h.

One preferred embodiment of this process is characterized in that the surface region to be coated is cleaned before the slurry formulation is applied. By way of example, this is possible using steel brushes and/or emery paper and/or cleaning fluids. A particularly advantageous property of the proposed slurry formulation is that it is possible to prepare the surface in this way without sand-blasting and to nevertheless achieve sufficient adhesion to the substrate even without a bond coat. This is a major advantage particularly if, as is preferred, the process is to be employed under very restricted space conditions, for example within a mounted gas turbine in the combustion chamber in order to cover joins (weld seams) of wall elements thereof. If it is necessary to subject the surface to blasting treatment at locations such as these, high costs are incurred, firstly because surrounding regions have to be covered and secondly because the blasting material has to be removed again from the adjoining and surrounding regions after treatment.

A further preferred embodiment of the process is characterized in that the slurry formulation is applied in each case with the aid of a brush, a roller, a spatula and/or a spray gun. In other words, the properties of the proposed slurry formulation mean that the latter makes it possible to dispense with complex application methods such as, for example, plasma processes, and this in turn makes it possible to employ the proposed process even under very restricted space conditions, for example within a mounted gas turbine of the combustion chamber as described above, and without excessive outlay on apparatus.

During the final treatment step of the entire coating structure, the latter is typically dried and hardened for at least 6 h at a temperature in the region of 95° C. and then for 15-30 min at a temperature in the region of 400° C. Particularly when using the process for joining the wall elements (half-shells) in the case of a mounted gas turbine or, more precisely, in the case of a mounted combustion chamber, it is a major advantage if, after each application step, the coatings already present in each case and/or the entire coating structure are/is dried and hardened with the aid of a drying attachment which is attached to the newly coated region and substantially covers the latter completely. Owing to the symmetry of a combustion chamber and the weld seams used in this context (typically extending axially and accordingly, all weld seams are normally arranged in an identical or at least similar surface topology), such a drying attachment can frequently be designed for all weld seams. The region to be covered with the new coating is preferably a weld seam, in particular a weld seam between half-shells (or quarter-shells) for a combustion chamber.

In particular, the drying attachment is then in the form of a case or a cover which is open on one side, substantially covers only the coated region and the inner side of which can favor or accelerate the drying and/or hardening, for example by the inner side or the cavity on the inside being exposed to hot air or being heated with an electrical resistance heater (light energy or another form of energy can also be introduced). Here, the drying attachment is preferably provided with an insulation coat substantially along all of its walls (to the side and at the top).

A further preferred embodiment of the proposed process is characterized in that it is carried out in order to coat regions which are exposed to the flow of hot gas in a gas turbine in the case of a gas turbine which is assembled substantially in the corresponding region. The process can therefore be employed in order to coat the weld seam between wall regions of the combustion chamber, typically adjacent to thermal barrier coatings which are already present on the wall regions adjacent to each other. Thermal barrier coatings of this type, which are already provided on the inner side of the wall regions before mounting, preferably have a thickness in the range of 0.4-1.5 mm. Here, the thermal barrier coatings normally do not extend right to the edge where the weld seam is arranged; a surface strip having a width of 5-15 mm is typically not provided with such a thermal barrier coating in the edge region of the wall regions.

The total width of the coating over the weld seam is typically in the range of 10-40 mm (in each case normally 5-20 mm over one of the two joined wall elements), preferably in the range of 20-35 mm, the respectively adjacent thermal barrier coating which has already been applied beforehand to the respective wall element preferably having a bevel with a width in the range of 2-10 mm.

Furthermore, the present invention relates to a combustion chamber (or a gas turbine having such a combustion chamber) with at least one combustion chamber wall which is joined together from elements joined by weld seams, wherein at least one weld seam is covered directly (i.e. typically substantially without a bond coat or at most with a bond coat in the boundary region) by a barrier coating region (patch, strip) produced using the process as described above.

BRIEF DESCRIPTION OF THE DRAWINGS

Preferred embodiments of the invention, which serve merely for explanation and are to be interpreted as non-limiting, are described below with reference to the drawings, in which:

FIG. 2 shows, in a), a partial axial section through a combustion chamber having an inserted drying attachment according to a first exemplary embodiment; in a') a section along the line A-A from FIG. 2a); in b) a partial axial section through a combustion chamber having an inserted drying attachment according to a second exemplary embodiment and, in b'), a section along the line B-B from FIG. 2b);

FIG. 3 shows sections substantially perpendicular to the direction in which the weld seam extends between the half-shells in a plane substantially perpendicular to the half-shells, where a) shows a situation in which the barrier coating region applied to the weld seam has approximately the same thickness as the thermal barrier coating on the half-shells, and b) shows a situation in which the barrier coating region applied to the weld seam is thinner than the thermal barrier coating on the half-shells; and FIG. 4 shows a section substantially perpendicular to the direction in which the weld seam extends between the half-shells in a plane substantially perpendicular to the half-shells, where two patches of barrier coating region are applied to half-shells without a thermal barrier coating.

DETAILED DESCRIPTION

Figure 1:
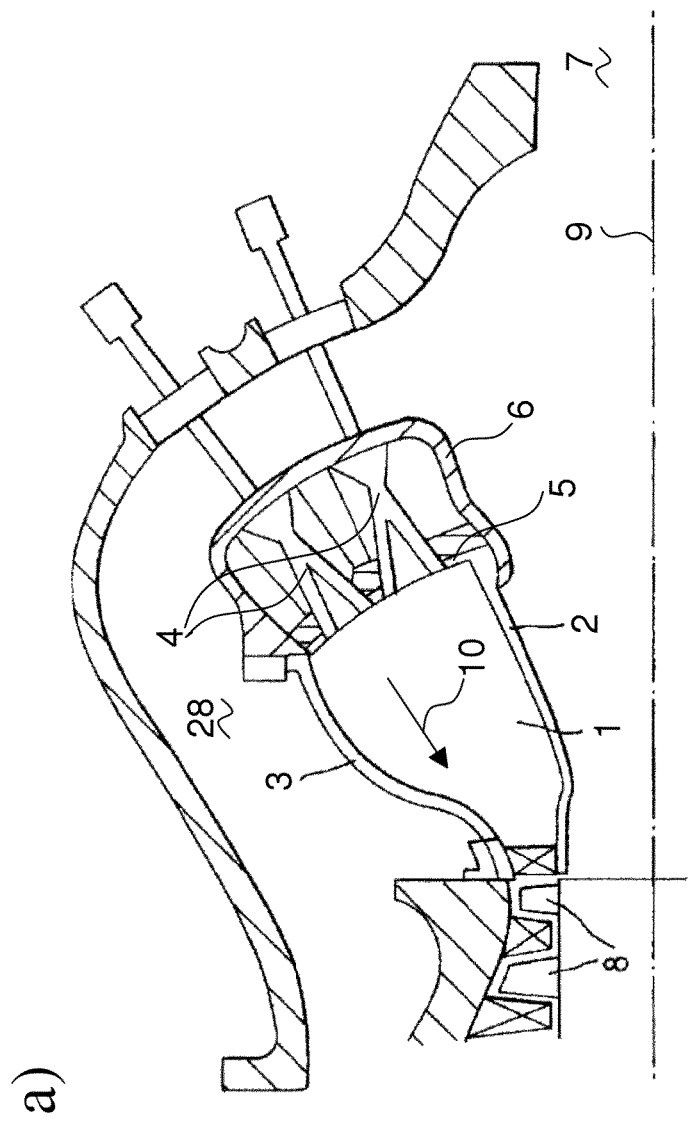
FIG. 1 shows, in a), an axial section through the central part of a gas turbine with an annular combustion chamber according to a first design and, in b), according to a second design with a combustion chamber having two zones.

FIG. 1a) shows a section through the central part of a gas turbine, i.e. the region between the compressor and turbine and also the end stage of the compressor and the first stage of the turbine. A compressor 7 compresses the air. Most of the air is introduced via the compressor plenum 28 into an annular combustion chamber 1 and mixed with fuel which burns therein. The hot combustion gases 10 flow away from there, while at the same time performing work, through a turbine 8 which rotates about an axis 9. The annular combustion chamber 1 is surrounded by an outer shell 3, an inner shell 2 and a front plate 5 through which the fuel premixed with compressor output air is introduced via burners 4. Some of the compressor output air, before being introduced into the annular combustion chamber 1, is conducted along the inner shell 2 and outer shell 3 for cooling. An outer cooling air guide sleeve and an inner cooling air guide sleeve, each in the form of cover plates, are normally provided around the combustion chamber shells 2, 3 for routing the cooling air. In order to generate a pressure difference which causes the cooling air to flow along between the cooling air guide sleeve and the combustion chamber shell, a burner cowl 6 is arranged at the outlet of the cooling air guide sleeve, a pressure which is below the compressor plenum pressure prevailing in said cowl. The air flows from this via the burners 4 or as front plate cooling air into the annular combustion chamber 1. The pressure loss between the compressor plenum 28 and the annular combustion chamber 1 is consequently divided into a part for combustion chamber shell cooling and a part for front plate cooling or admixing to the burners 4.

FIG. 1b) shows a somewhat different design of an annular combustion chamber, the latter having a segmented first zone 23 and a peripheral second zone 24. In this case, the inner shell 2 and outer shell 3 delimit this second zone 24. For connection to the housing parts of the first zone 23, the inner shell 2 and/or outer shell 3 typically have flange-like extensions which face away from the combustion chamber. In this exemplary embodiment, it is also possible to identify the outer cooling air guide sleeve and the inner cooling air guide sleeve, which are each in the form of cover plates 25 fastened to the outside of the inner shell 2 or outer shell 3 by way of fastening elements 26 which simultaneously serve as spacers. A duct 27 for routing the cooling air, as mentioned above, is thus formed between the respective shell and the corresponding sleeve.

The inner shell 2 and outer shell 3 are typically in the form of half-shells guided through 180° about the burner axis, respectively a lower half-shell and an upper half-shell. During mounting, the lower half-shell is predefined, the central elements to be fitted axially are inserted and then the upper shell is positioned in each case. The inner half-shells 2a and 2b then butt against each other at edges lying substantially in a horizontal plane, and the outer half-shells 3a and 3b likewise butt against each other at edges lying substantially in an identical horizontal plane (see, for example, FIGS. 2a', 2b'). The half-shells are joined at these edges with the aid of a welding process after they are joined together, i.e. under very restricted space conditions. A substantially continuous casing surface is thus formed for the combustion chamber.

The region of this joining line (i.e. the weld seam where the neighboring edges of the casing portions adjoin) is exposed to the high temperatures and the thermal loading during operation of the gas turbine. The invention intends to make it possible to apply a thermal barrier coating in this region of the joining line, even though the elements have already been assembled and accordingly extremely difficult space conditions prevail.

In actual fact, the metal sheets which form the half-shells 2a/2b or 3a/3b are provided with a thermal barrier coating over almost the entire surface, on that side which faces toward the combustion chamber. The typical structure of these metal sheets can be seen in FIG. 3. A metal-based bond coat 19, typically on the basis of alloys based on Ni, Al and Cr, or Co, Ni, Al and Cr or Pt and Al, is first arranged on the metallic base body 2/3. The coatings may also be present in the form of structures of the formula MAl, where M is at least one element selected from the group consisting of Fe, Ni and Co, for example in the form of MAl, MAlY, MCrAl, MCrAlY or else PtAl. Systems of the MCrAl(X) type are also possible, M in turn being selected from the group consisting of Ni, Co, Fe and combinations thereof; X is an element selected from the group consisting of Y, Ta, Si, Hf, Ti, Zr, B, C and combinations thereof.

A ceramic thermal barrier coating 20 is arranged on this bond coat 19 and typically only adheres sufficiently to the substrate 2/3 on account of the bond-imparting bond coat 19. This ceramic coating 20 normally consists of zirconia stabilized with 6-8% by weight yttria (YSZ), as is known from U.S. Pat. No. 4,485,151. The structure of bond coat 19 and ceramic coating 20 is normally referred to as a thermal barrier coating 21.

The metallic bond coats and also the ceramic coating can be applied with the aid of vapor deposition methods, such as PVD and CVD, or thermal spraying methods, and also plasma spraying methods.

In the boundary region, to be precise where the two half-shells adjoin each other, the surfaces which face toward the combustion chamber do not have such a thermal barrier coating 21, normally over a strip which runs along the edge where an entirely clear width of about 30 mm is produced, i.e. each metal sheet does not have such a thermal barrier coating on the edge over a width of 10-15 mm. This is the case so that it is then possible to form a weld seam 16.

It is not possible to provide this region of the weld seam 16 with a thermal barrier coating using the processes which are currently customary for applying a thermal barrier coating. This therefore also includes the complex, structural prior-art protective measures which are mentioned in the introduction for preventing overheating of the weld seam and the adjoining regions by providing, for example, additional cooling-air flows or separate heat shields arranged over the weld seam. A first problem in relation to the application of a thermal barrier coating is that, in the mounted state (the half-shells can be welded to each other only in this state), it is next to impossible to carry out surface treatment such as sand-blasting or to use technology such as plasma spraying methods (protective measures, cleaning measures, no on-site automation possible after the welding of the separating planes of the joining seam). Furthermore, the application processes and the available materials known from the prior art do not make it possible to build up a sufficient coating thickness in few steps.

Accordingly, the present invention proposes both a novel slurry formulation (ceramic suspension), which can be used in these conditions, and also a novel rapid and uncomplicated process for applying such a slurry formulation in order to build up a sufficiently thick thermal barrier coating.

The newly proposed slurry formulation substantially comprises a ceramic binder, ceramic fillers and, if appropriate, further additives. The ceramic binder is largely responsible for adhesion to the substrate, particularly in the present situation where a metallic bond coat is to be dispensed with. The resistance to temperature changes is greatly influenced by the fillers. The coefficient of thermal expansion of the filler should be as close as possible to that of the base material (substrate). In addition, the thermal conductivity of the filler should be as low as possible so as to ensure the best possible shielding from heat.

There is a whole range of ceramic bonding agents and lacquers on the market which are allegedly suitable for producing thermal barrier coatings. However, use on nickel-base alloys at 1000-1100° C. is not mentioned in the case of such commercial systems. Laboratory tests and field tests using such commercial systems have shown that these cannot be used for the intended purpose on a weld seam in a combustion chamber.

In a comparative experiment, this was proven by coating Inconel 617 substrates with commercial ceramic suspensions by painting, and drying these according to manufacturer specifications (coating thickness 0.1-0.3 mm). The durability of the coatings was tested in a thermal shock test (5 minutes in a fluidized sand bath at 1000° C. and 5 minutes in a fluidized sand bath at 20° C. correspond to a cycle). It was indeed shown that the barrier coatings using commercial materials had spalled after just a few cycles and are therefore unsuitable for the intended use. Accordingly, the commercial slurry formulations or thermal barrier coatings produced therefrom do not adhere sufficiently to the base material and do not have a sufficient resistance to temperature changes. The corresponding results are compiled in the table below:

| Coating system | Adhesion at RT | Thermal cycles until delamination |
| --- | --- | --- |
| Ceramabond 569 | Good | 1 |
| Ceramabond 571 | Good | 3 |
| Fiberfrax QF-180 | Good | 10 |
| Pyro-Putty 677 | Only on sand-blasted surface | 1 |
| Cerama-Dip 538-N | Good | 1 |
| Pyro-Paint 634-AS | Only on sand-blasted surface | 2 |

In said thermal shock test, however, a minimum service life of 200 thermal cycles is required. This is readily achieved by the thermal barrier coatings on the basis of the newly proposed slurry formulation. In actual fact, 300-500 cycles are achieved if the proposed slurry formulations are used.

According to the invention, such a slurry formulation is applied to a metallic surface (rolled material, milled material, with or without a weld seam, for example between two half-shells for a combustion chamber) using a spatula, a roller, a brush or by means of an air-spraying process in few steps (no more than four application steps) and initially dried between each step until a coating thickness in the range of 0.4-1 mm is reached, and finally dried and hardened at the end. In this way, patches or strips of this nature can be produced quickly and easily, for example, over a weld seam between such half-shells within one day even under the narrow space conditions in the mounted combustion chamber.

It is thus possible to protect that region (for example in the region of the weld seam) against heat and corrosion. Furthermore, the special slurry formulation selected makes it possible to completely dispense with the use of a bond coat, and it is also possible to dispense with the sand-blasting of the surface before the slurry formulation is applied. No heavy, complex plasma equipment, as is required for normal TBC application processes, is needed. Such a coating can be built up completely within one day and a coating structure of this type can also be applied repeatedly and used, for example, for local repairs during inspections.

The text below describes a number of exemplary embodiments:

The Inconel substrates (60×40×7 mm) are firstly initially ground with sand paper (grade 50-90) so as to produce an initially roughened, metallically clean surface. This surface is then also cleaned and degreased with organic solvents. A brush or a spray gun is then used to apply the ceramic suspension in a plurality of coatings, until an overall coating thickness of 0.2-0.8 mm is reached (individual coating thickness about 0.1-0.2 mm). The individual coatings are subjected to interim drying using, for example, a dryer for 1-3 minutes at 70-80° C. The final drying of the overall coating is carried out in a furnace at 75-95° C. for 4-16 hours.

The performance of the coatings produced in this way is then tested in a thermal shock test at 1000° C. In this test, the sample is dipped alternately into a fluidized sand bath at 1000° C. or 20° C. The number of cycles which the coating survives until the first instances of spalling occur is referred to as the service life of the coating. In the thermal shock test, the coatings produced with the described suspensions and the described process reached 300-500 cycles, and this more than meets the requirements for the planned use.

Example 1

100 g of an aqueous sodium silicate solution (module 2.5; about 40% by weight of sodium silicate in water) are mixed with 96 g of yttria-stabilized zirconia having a mean grain size of 0.3 μm and agitated thoroughly with a wooden spatula. The mixture is then treated with ultrasound for 15 minutes. A moderately viscous, homogeneous, stable suspension which can readily be processed using a brush or a spray gun is formed.

Example 2

As per example 1, except that the aqueous alkali metal silicate solution used is a mixture of 60 g of the same sodium silicate solution (module 2.5) and 40 g of potassium silicate solution (module 2.4; about 35% by weight of potassium silicate in water). A homogeneous, stable suspension which can readily be processed is likewise formed.

Example 3

As per example 1, except that the filler used is 67 g of magnesia having a mean grain size of 0.05 μm. A homogeneous, stable suspension with good processing properties is also formed in this case.

Example 4

An Inconel substrate (length×width×thickness=60×40×7 mm) is coated with the ceramic suspension from example 1 using a compressed-air spray gun. The substrate is ground beforehand with emery paper (grade 50) and rinsed with acetone. After the solvent has evaporated, the sample is positioned vertically in a spray booth and coated 5 times in a stepwise manner using the spray gun. The individual coatings are subjected to interim drying using the dryer for 2 minutes. The optimized viscosity of the suspension means that the individual coatings do not wear off, and a smooth, homogeneous overall coating is formed. The final drying is carried out in a furnace at 80° C. for 10 hours. After drying, a coating thickness of 0.4-0.5 mm is measured using a coating thickness measurement device (eddy-current technique). In the thermal shock test in the fluidized sand bath (1 cycle=5 minutes at 1000° C.+5 minutes at 20° C.), the sample reaches a service life of 430 cycles.

FIG. 3 shows two sectional illustrations of a coating region 22 which can be produced by the proposed process. The respective half-shells 2a/2b and 3a/3b butt bluntly against each other (typically with flanks beveled in a V) and the weld seam 16 is arranged at this abutment. A previously applied, conventional thermal barrier coating 21 is already built up on that upper side of the respective half-shells 2/3 which faces toward to the hot-gas side 17, in contrast to the uncoated rear side 18, and this thermal barrier coating comprises, as already mentioned above, a bond coat 19 and, on the latter, a ceramic coating 20 which faces toward the hot-gas side 17.

The half-shells 2/3 are not equipped with such a thermal barrier coating 21 in the boundary region in which they butt against each other, i.e. the metallic material of the elements 2/3 is simply exposed at the edge of each element over a width W1 of about 15 mm. Here, a bevel 30 of the thermal barrier coating 21 may be provided so that the subsequently applied strip 22 adheres better in the boundary region. The width of the uncoated boundary region, including the bevel/petering out zone W2, is correspondingly enlarged with respect to W1.

The proposed process is then used to apply the barrier coating 22 to the weld seam 16 and to that region of the elements 2/3 which is exposed on the upper side. As shown in FIG. 3a, this can firstly be done in such a way that the surface of the region 22 is substantially flush with the surrounding coating 21, and a smooth surface is produced.

However, as shown in FIG. 3b, it is also possible to form a slight depression in the region of the weld seam 16, in which case the reduced thickness of the barrier coating 22 (reduced thickness d') is then in the range of 0.3-0.6 mm, given an overall thickness d of the thermal barrier coating of about 0.4-1.1 mm.

As shown in FIG. 4, the proposed barrier coating 22 may also be used simply just to produce patches on a surface. Therefore, it is not necessary for the barrier coating 22 to be inserted to some extent between already existing regions of thermal barrier coatings 21, as is shown in FIG. 3. If, as shown in FIG. 4, such patches or strips are applied individually, it proves to be advantageous to allow these patches or strips to peter out at the edge with a petering out region having a width a of about 5 mm. Otherwise, the boundary regions are subjected to excessive loading and may come off. In order to successfully carry out the process, it is advantageously possible to use drying attachments for the drying steps, as shown in FIG. 2.

FIGS. 2a and 2a' show a first design of such a drying attachment 11. The first design involves a box-shaped design in which, to a certain extent, a box which is open toward the bottom, is provided with an insulation coat 29 (this coat can be provided on the outside or inside in relation to a wall) and has a straight upper wall has lateral walls, the curvature of which is matched in this case to the outer burner casing. Such a box can be positioned on the combustion chamber wall so as to cover the weld seam 16, if appropriate using seals in the contact region 14 (cf. FIG. 2a'). A line 12 (for example copper piping) which is acted upon with hot air and runs along the box 11 is provided in this box 11, this line having perforations so that the hot air 13 flows out of this line 12 in a manner distributed over the entire length of the box 11, and can thus heat and therefore dry/harden the entire weld seam 16 where a barrier coating has been applied (in each of FIGS. 2a' and 2b', the applied barrier coatings are not shown in order to improve visualization).

FIG. 2b shows an alternative design. Whereas a box as per FIG. 2a can by all means have a height of about 15 cm at the highest point, given a width of about 7-12 cm, the design shown in FIG. 2b has a significantly flatter configuration and has a height of about 2-4 cm, given a width of about 7-16 cm. The box used here is nestled over its entire length substantially against the contour of the combustion chamber and is situated directly over the weld seam 16, so as to form a hollow space with a small volume. Heating wires 15 fastened to the drying attachment 11 are arranged in this hollow space. In order to dry a barrier coating 22, this elongate box, or better this elongate cover, is placed on the newly produced barrier coating 22 and the heating system is connected to an electrical power source. In this case too, the box 11 is provided with an insulation coat 29.

LIST OF REFERENCE SYMBOLS

1 Annular combustion chamber
2 Inner burner casing
2a Upper half-shell of 2
2b Lower half-shell of 2
3 Outer burner casing
3a Upper half-shell of 3
3b Lower half-shell of 3
4 Double-cone burner
5 Front plate
6 Burner cowl
7 Compressor
8 Turbine
9 Axis
10 Hot combustion air flow
11 Drying attachment
12 Hot-air line
13 Air flowing out of 12
14 Contact region between 2/3 and 11
15 Heating wires
16 Weld seam
17 Hot-gas side
18 Rear side
19 Bond coat (BC)
20 Ceramic coating
21 Thermal barrier coating (TBC)
22 Barrier coating region
23 Zone 1
24 Zone 2
25 Outer cover plate
26 Fastening elements/spacers
27 Hollow space for cooling air flow
28 Compressor plenum
29 Insulation coat
30 Bevel of 21
W1 Width of the uncoated boundary region of 2/3
W2 Width of the uncoated boundary region, including the bevel/petering out zone
d Thickness of the thermal barrier coating
d' Thickness of the barrier coating region
a Width of the bevel/petering out zone

| LIST OF REFERENCE SYMBOLS | |
|---|---|
| 1 | Annular combustion chamber |
| 2 | Inner burner casing |
| 2a | Upper half-shell of 2 |
| 2b | Lower half-shell of 2 |
| 3 | Outer burner casing |
| 3a | Upper half-shell of 3 |
| 3b | Lower half-shell of 3 |
| 4 | Double-cone burner |
| 5 | Front plate |
| 6 | Burner cowl |
| 7 | Compressor |
| 8 | Turbine |
| 9 | Axis |
| 10 | Hot combustion air flow |
| 11 | Drying attachment |
| 12 | Hot-air line |
| 13 | Air flowing out of 12 |
| 14 | Contact region between 2/3 and 11 |
| 15 | Heating wires |
| 16 | Weld seam |
| 17 | Hot-gas side |
| 18 | Rear side |
| 19 | Bond coat (BC) |
| 20 | Ceramic coating |
| 21 | Thermal barrier coating (TBC) |
| 22 | Bather coating region |
| 23 | Zone 1 |
| 24 | Zone 2 |
| 25 | Outer cover plate |
| 26 | Fastening elements/spacers |
| 27 | Hollow space for cooling air flow |
| 28 | Compressor plenum |
| 29 | Insulation coat |
| 30 | Bevel of 21 |
| W1 | Width of the uncoated boundary region of 2/3 |
| W2 | Width of the uncoated boundary region, including the bevel/petering out zone |
| d | Thickness of the thermal barrier coating |
| d' | Thickness of the barrier coating region |
| a | Width of the bevel/petering out zone |

The invention claimed is:

1. A slurry formulation for production of a patch or a strip of a thermal barrier coating comprising:
   20-60 dry weight percent of alkali metal silicate binder;
   40-80 dry weight percent of a ceramic filler comprising yttria-stabilized zirconia, magnesia, or yttria-stabilized zirconia and magnesia;
   0-20 dry weight percent of an additive; and
   a solvent or a suspension agent,
   wherein the dry weight percent of the alkali metal silicate binder, ceramic fillers, and additives add up to 100%, and
   wherein the slurry formulation has a viscosity in a range of 50 to 5000 mPas at room temperature.

2. The slurry formulation as recited in claim 1, wherein the solvent or the suspension agent is water.

3. The slurry formulation as recited in claim 2, wherein the slurry formulation has a viscosity in a range of 500 to 1500 mPas at room temperature.

4. The slurry formulation as recited in claim 1, wherein the alkali metal silicate binder has a module in a range of 1.8 to 3.5.

5. The slurry formulation as recited in claim 4, wherein the alkali metal silicate binder comprises lithium silicate, sodium silicate, potassium silicate, or a mixture thereof, having a module in a range of 2 to 2.5.

6. The slurry formulation as recited in claim 1, wherein the ceramic fillers have a mean grain size in a range of 0.01 to 1 μm and a coefficient of thermal expansion of in a range of a coefficient of thermal expansion of an underlying substrate.

7. The slurry formulation as recited in claim 6, wherein the coefficient of thermal expansion of the fillers is in a range of 10 to 15 ($10^{-6}$/K) at room temperature.

8. A method for the production of the slurry formulation of claim 1, the method comprising:
   adding 40-80 dry weight percent of a ceramic filler comprising yttria-stabilized zirconia, magnesia, or yttria-stabilized zirconia and magnesia, to an aqueous solution of alkali metal silicate binder having 20-60 dry weight percent of alkali metal silicate binder;
   mixing the ceramic filler and the binder to form a suspension;
   adding 0-20 dry weight percent of an additive to the suspension, wherein the dry weight percent of the alkali metal silicate binder, ceramic fillers and additives add up to 100%; and
   setting the viscosity by adding water.

9. A method for building up a region of a thermal barrier coating with the slurry formulation of claim 1, the method comprising:
   (iii) applying a first quantity of a slurry formulation comprising
   20-60 dry weight percent of alkali metal silicate binder,
   40-80 dry weight percent of a ceramic filler comprising yttria-stabilized zirconia, magnesia, or yttria-stabilized zirconia and magnesia,
   0-20 dry weight percent of an additive, wherein the dry weight percent of the alkali metal silicate hinder, ceramic fillers, and additives add up to 100%, and a solvent or a suspension agent
   directly to a region of a metallic substrate without a bond coat, at a thickness of between 0.05 and 0.3 mm;
   (iv) preliminarily drying the first quantity of the slurry formulation, to obtain a dried slurry formulation;
   (v) applying a further quantity of the slurry formulation to the dried slurry formulation;
   (vi) drying the further quantity of the slurry formulation;
   (vii) repeating the applying (iii) and the drying (iv) until a thickness of a coating comprising the slurry formulation is between 0.4 and 1 mm, so as to form a primary coating structure;
   (viii) drying and hardening the primary coating structure for at least 6 hours at a temperature of between 80 and 100° C., to obtain a secondary coating structure; and
   (ix) further drying and hardening the secondary coating structure for at least 15 minutes at a temperature of at least 400° C., thereby producing a coated region comprising a coating structure.

10. The method as recited in claim 8, further comprising:
    (i) cleaning the metallic substrate and roughening the metallic substrate with emery paper before the applying (iii) of the first quantity of the slurry formulation.

11. The method as recited in claim 8, wherein the applying of the first and further quantities of slurry formulation is performed using at least one of a spatula, a roller, a brush, and a spray gun.

12. The method as recited in claim 11, further comprising:
    (ii) covering boundary regions of the metallic substrate not to be coated before the applying (iii) of the first quantity of the slurry formulation.

13. The method as recited in claim 8, wherein the drying and hardening (viii) is performed at a temperature in a region of 95° C., and
    wherein the further drying and hardening (ix) is performed between 15 and 30 minutes at a temperature in a region of 400° C.

14. The method as recited in claim 8, wherein the drying and hardening is performed using a drying attachment attached to the coated region and substantially covering the coated region.

15. The method as recited in claim 14, wherein the coated region is a weld seam,
    wherein the drying attachment is a case or a cover, and
    wherein the drying attachment includes an inner side exposed to hot air or heated with an electrical resistance heater.

16. The method as recited in claim 8, wherein the coated region is exposed to a flow of hot gas in a gas turbine during normal operation,
    wherein the gas turbine is substantially assembled while the method is performed.

17. The method as recited in claim 8, wherein the coated region is a weld seam disposed between two wall regions of a combustion chamber of a gas turbine and adjacent to a thermal barrier coating disposed on each of the two wall regions.

18. The method as recited in claim 17, wherein a width of the coating structure covering the weld seam is in a range of 10 to 40 mm.

19. The method as recited in claim 18, wherein the thermal barrier coating disposed on each of the two wall regions includes a bevel having a width in a range of 2 to 10 mm.

20. The slurry formulation as recited in claim 4, wherein the ceramic filler comprises yttria-stabilized zirconia.

* * * * *